(12) United States Patent
Konovalov (10) Patent No.: US 8,371,250 B2
(45) Date of Patent: Feb. 12, 2013

(54) VOLUME SENSITIVITY ADJUSTABLE CANINE BARKING SUPPRESSION DEVICE

(76) Inventor: Deonisy Konovalov, Molalla, OR (US)

(*) Notice: Subject to any disclaimer, the term of this patent is extended or adjusted under 35 U.S.C. 154(b) by 186 days.

(21) Appl. No.: 13/022,590

(22) Filed: Feb. 7, 2011

(65) Prior Publication Data

US 2012/0048213 A1    Mar. 1, 2012

Related U.S. Application Data

(63) Continuation-in-part of application No. 12/868,674, filed on Aug. 25, 2010.

(51) Int. Cl.
*A01K 15/02*    (2006.01)

(52) U.S. Cl. .......... 119/718; 119/719; 119/858; 84/406; 84/409

(58) Field of Classification Search .................. D30/152; 119/718, 719, 858; 84/406, 407, 408, 409, 84/410

See application file for complete search history.

(56) References Cited

U.S. PATENT DOCUMENTS

| | | | | | |
|---|---|---|---|---|---|
| 3,159,140 | A | * | 12/1964 | Miller | 119/719 |
| 3,253,574 | A | * | 5/1966 | Malta | 116/171 |
| 3,468,290 | A | * | 9/1969 | Elliott | 119/709 |
| 3,498,266 | A | * | 3/1970 | Miller | 119/719 |
| 3,504,365 | A | * | 3/1970 | Gosswiller | 340/396.1 |
| 3,570,457 | A | * | 3/1971 | Curtis | 119/719 |
| 4,566,400 | A | * | 1/1986 | Keenan et al. | 116/171 |
| 5,107,793 | A | * | 4/1992 | Tymkewicz | 119/719 |
| D336,693 | S | * | 6/1993 | Miller | D30/199 |
| D337,865 | S | * | 7/1993 | Miller | D30/199 |
| D338,747 | S | * | 8/1993 | Miller | D30/152 |
| 2009/0064843 | A1 | * | 3/2009 | Miller | 84/410 |
| 2009/0193958 | A1 | * | 8/2009 | Webb | 84/406 |
| 2009/0282703 | A1 | * | 11/2009 | Carson | 36/139 |

* cited by examiner

*Primary Examiner* — Kimberly Berona
*Assistant Examiner* — Joshua Huson
(74) *Attorney, Agent, or Firm* — Mark S. Hubert (57) ABSTRACT

A non powered, canine barking suppression device that can rapidly altering a dog's behavior so as to visibly reduce anxiousness and unwanted barking.

The device subjects the dog to random vibrations and audible tones generated by an enclosed tuning fork that is worn around the dog's neck. The tuning forks when struck, emit a selected frequency selected for a specific purpose and or specific breed of canine. This frequency lies between 0 and 200,000 Hz, which is the range of sound that has been shown that most canines can hear. Since it is non powered it is not prone to failure in wet or cold environments, is durable and inexpensive. The device has claims of additional therapeutic properties and the general physical structure has applications elsewhere, although the preferred embodiment and best mode are directed to stopping unnecessary barking.

11 Claims, 6 Drawing Sheets

VOLUME SENSITIVITY ADJUSTABLE CANINE BARKING SUPPRESSION DEVICE

This patent application claims domestic priority from and is a continuation in part patent application of U.S. patent application Ser. No. 12/868,674, entitled "NON-POWERED CANINE BARKING SUPPRESSION DEVICE" filed on Aug. 25, 2010. All of U.S. patent application Ser. No. 12/868,674 is incorporated by reference herein.

BACKGROUND OF THE INVENTION

The present invention relates to a new and improved volume adjustable canine barking suppression device capable of rapidly altering a dog's behavior so as to visibly reduce their anxiousness, calm the dog and drastically reduce their barking.

There are several systems utilized to calm an anxious dog or to stop needless, annoying barking. To date, these systems all work by subjecting the dog to an unpleasant stimuli at the time of the bark initiation. These may be in the form of a high voltage electric shock applied to the dog's neck or a puff of disagreeably smelling aerosol expelled in close proximity to the dog's nose. They require expensive systems and a DC power source to operate. In rain or water they malfunction and may fail permanently. Other behavior training systems that rely on sound emit a repeatable sound upon the detection of such unwanted behavior as barking. This is generally loud and can frighten sensitive dogs. Lastly, many owners feel that such systems of canine behavior modification are cruel, and while needed will not likely be purchased or used by them.

Henceforth, a non powered interactive canine barking suppression system that had a volume adjustment and that not hurt the dog, would not fail in wet or cold environments and would be durable and inexpensive, would fulfill a long felt need in the field of canine behavior modification. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a non-powered, economical, durable, canine behavior modification device that is not hurtful to a dog. In addition, to providing dog behavior modification such as cessation of barking the present invention has claims of additional therapeutic properties and the general physical structure has applications elsewhere, although the preferred embodiment and best mode are tied to stopping unnecessary barking.

It has many of the advantages mentioned heretofore and many novel features that result in a new and improved canine bark suppression system which is not anticipated, rendered obvious, suggested, or even implied by any of the prior art, either alone or in any combination thereof.

In accordance with the invention, an object of the present invention is to provide an improved interactive non-powered, canine bark suppression device capable of rapid correction of unnecessary barking.

It is another object of this invention to provide an improved canine bark suppression device that is durable and will not fail in adverse weather conditions or if immersed underwater.

It is a further object of this invention to provide an improved canine bark suppression device that is inexpensive to produce and has an extremely low failure rate.

It is still a further object of this invention to provide an improved canine bark suppression device that has additional therapeutic qualities.

It is yet another object of this invention to provide an improved canine bark suppression device that is based on the emission on an audible tone that has the ability for volume control of the audible tone.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

There has thus been outlined, rather broadly, the more important features of the canine bark suppression device in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the canine bark suppression device in detail, it is to be understood that the invention is not limited in its application to the details of construction and to the arrangements of the components set forth in the following description or illustrated in the drawings. The invention is capable of other embodiments and of being practiced and carried out in various ways. For example, although throughout the alert fob is associated with a key ring and the alert card is associated with the wallet, it is known that these alert devices may be physically connected to other items such as an MP3 player, an article of clothing, a camera, etc. Also, it is to be understood that the phraseology and terminology employed herein are for the purpose of descriptions and should not be regarded as limiting.

Figures 1, 2:
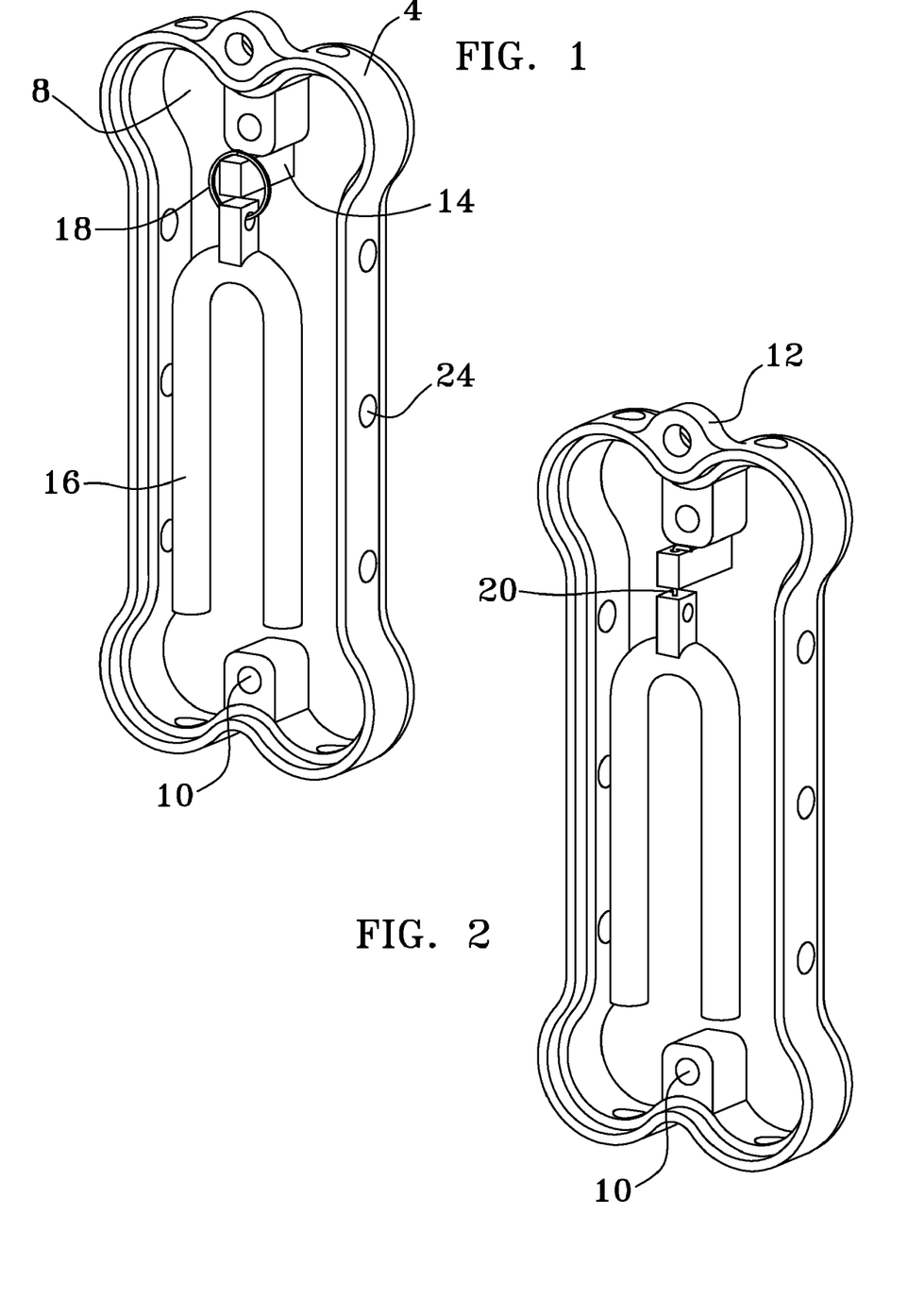
FIG. 1 is a front perspective view of the interior cavity of the canine bark suppression device showing the general arrangement of the components in the preferred embodiment.
FIG. 2 is a front perspective view of the interior cavity of the canine bark suppression device showing the general arrangement of the components in the first alternate embodiment.
Figure 3:
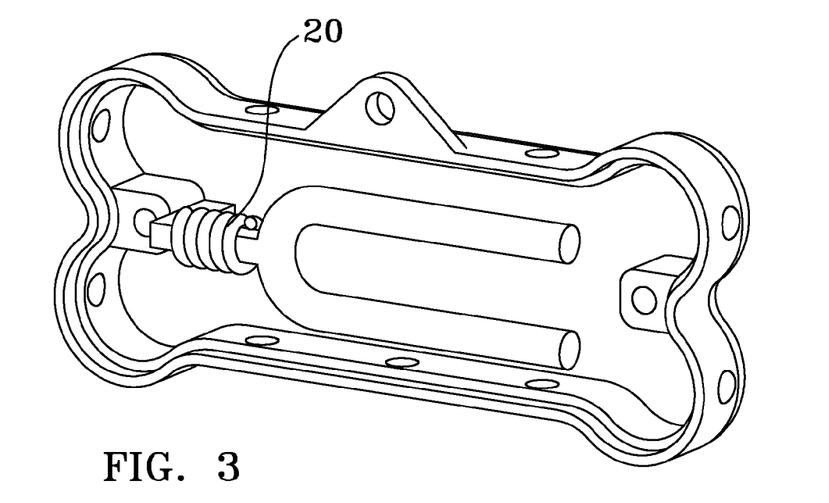
FIG. 3 is a front perspective view of the interior cavity of the canine bark suppression device showing the general arrangement of the components in the second alternate embodiment.
Figure 6:
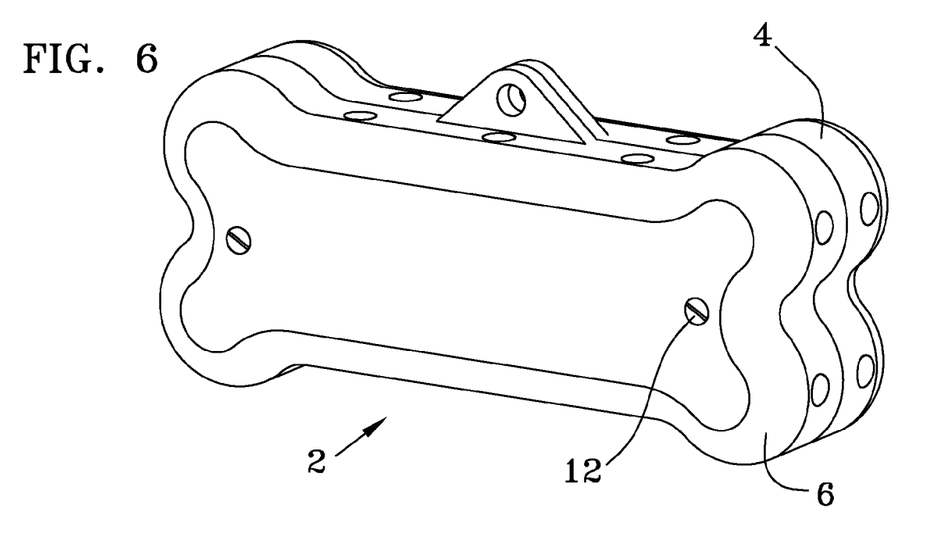
FIG. 6 is a front perspective view of the canine bark suppression device's enclosure.

Looking at FIGS. 1 and 6 it can be seen that the improved canine bark suppression device 2 has the general shape of a dog bone made from the assembly of a concave first half 4 and a concave second half 6. In the concavity 8 of the first half 4 there is formed on the inner surface two bosses 10 that are matingly threaded to accept taper headed screws 12 that extend from the surface of the second half 6 and through an orifice in the second half so as to facilitate the mechanically coupling of the two halves. It is known that there area plethora of additional methods of connecting these two halves as would be well known in the art. The periphery of the assembled device 2 has numerous ports 24 formed there through to allow enhanced transmission of the audible frequency emitted from within the internal cavity of the device 2. The device 2 has a hanging tab 12 extending from the exterior surface of the device 2. This tab allows for the attachment of the device 2 to a dog collar, clothing or leash. As can be seen in FIG. 1 and FIG. 3, this tab 12 may cause the device to hang with its longitudinal axis in a horizontal or vertical orientation. The location of the hanging tab 12 determines the orientation of the internal components of the device 2. (It is to be noted that the designation of first and second half is of no consequence as any of the internal components can be interchangeably connected to or formed on either of these halves.)

Looking at FIG. 1 it can be seen that there is a mounting means 14 extending from the internal surface of the device's cavity from which an audible frequency generator or tuning fork 16 is operationally connected. Although a tuning fork 16 is shown in all the figures a tuning rod has also been employed successfully as an audible frequency generator. In the preferred embodiment the tuning fork 16 is freely connected to the mounting means 14 by a suspension means 18. Here the suspension means is a ring. In FIG. 2 the first alternate embodiment the suspension means is a longitudinal member which is a wire 20. In FIG. 3 the second alternate embodiment it can be seen that the suspension means is a wound spring. There are numerous type of suspension means 20 that will work including but not limited to wires, springs, string, cable, pivotable rods, link chains etc.

The suspension means 20 serves to hold the tuning fork 16 away from the inside of the device 2 or away from the striking means 22 when the device is in its resting or non-jostled position. It may serve to hold the tuning fork 16 rigid in embodiments where there is a striking means 22 that moves to collide with the tuning fork 16 or it may allow the tunning fork to swing freely to contact a striking means 20 or the inside of the device itself in other embodiments.

The suspension means 20 generally will have a distal end and a proximate end wherein one of these ends is connected to the mounting means 14 and the other end is connected to the tuning fork 16. As can be seen in FIGS. 1 and 2 the device 2 has the hanging tab 12 located such that the device 2 will be oriented vertically when on the dog. Here the suspension means (ring and wire) 20 allows the tuning fork 16 to freely swing as the device 2 is jostled with the dog's movements, such as is caused by barking. This causes the tuning fork 16 to strike the inside of the device 2 causing the tuning fork to vibrate at its specific frequency emitting that frequency of sound and vibration. This emitted sound traverses through the ports 24 to the dog's ears. Experimentation has shown that using a tuning fork that has a frequency up to 200,000 Hz will reduce the dog's desire to bark and generally calm him. The vibrations caused by the tuning fork
are also reported to have therapeutic effects such as flea riddance, toxic riddance, increasing blood flow, and simulating blood cells.

Figure 4:
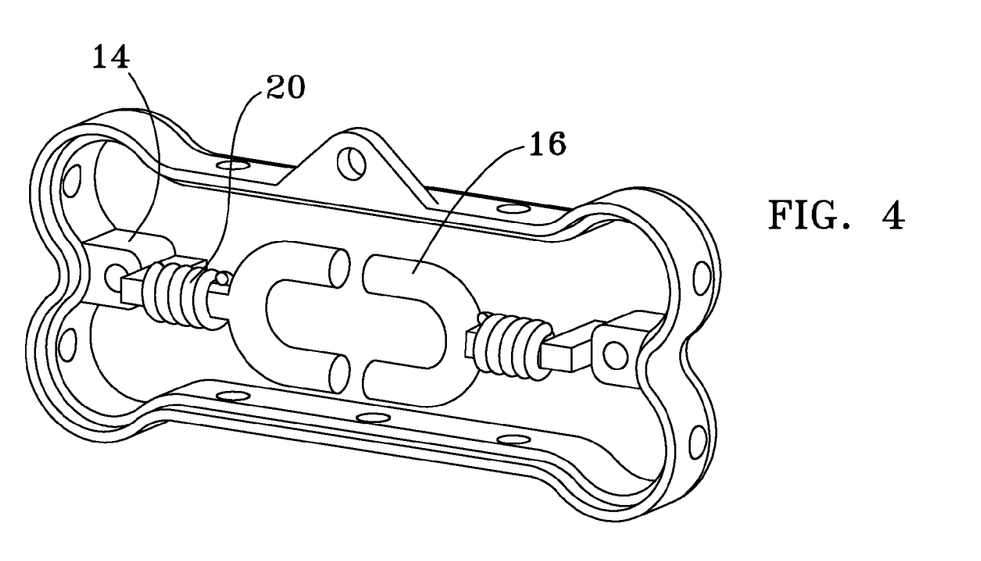
FIG. 4 is a front perspective view of the interior cavity of the canine bark suppression device showing the general arrangement of the components in the third alternate embodiment.

As can be seen in FIGS. 3 and 4 the device 2 has the hanging tab 12 located such that the device 2 will be oriented horizontally when on the dog. Here the suspension means 20 allows the tuning fork 16 to be suspended within the cavity and upon overcoming a certain amount of jostling motion will allow the tuning fork 16 to swing enough to have a collision and then return to its suspended position so as to maintain the tuning fork's vibration. When the tuning fork 16 is in continued contact with any physical body there can be no vibration of the tuning fork 16.

FIG. 4 shows a third alternate embodiment that employs the same basic structure and operation as the previous devices 2 except that it utilizes more than one tuning fork 16 and suspension means 20 and mounting means 14.

Figure 5:
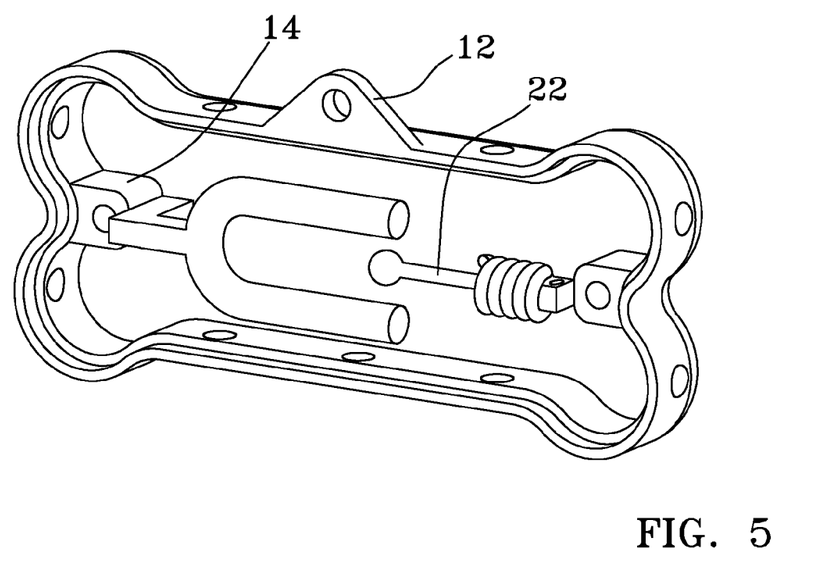
FIG. 5 is a front perspective view of the interior cavity of the canine bark suppression device showing the general arrangement of the components in the fourth alternate embodiment.

In the fourth alternate embodiment shown in FIG. 5 it can be seen that the tuning fork 16 is rigidly held in a mounting block 14 and a striking means 22 is moveably mounted in another mounting block 14 by a second suspension means. In this embodiment the striking means 22 is jostled by the dog's movements to collide with and begin the vibration and resonation of the tuning fork 16. When struck the tanning fork 16 will resonate at a frequency (with a decreasing amplitude and volume) that is less than 200,000 Hz. This is the complete range of audible frequencies in the hearing range of most canines.

Figure 7:
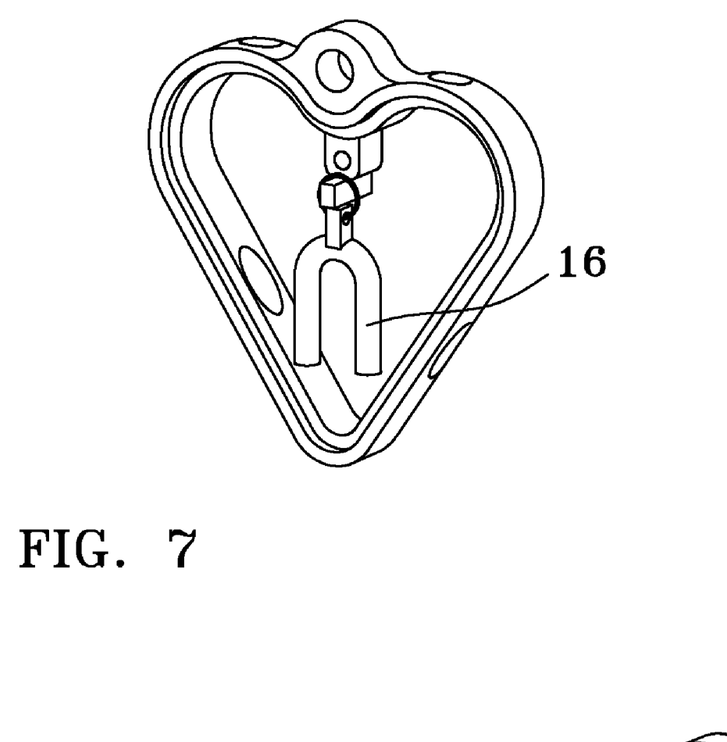
FIG. 7 is an interior front perspective view of a fifth alternate embodiment.
Figure 8:
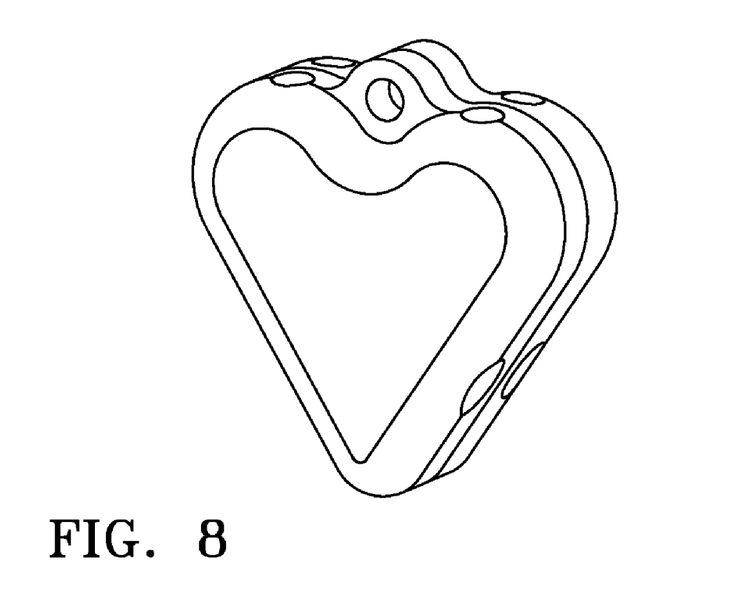
FIG. 8 is a exterior front perspective view of a fifth alternate embodiment.

FIGS. 7 and 8 illustrate another physical geometry of the enclosure of the device 2 made from the assembly of the concave first half 4 and concave second half 6. Here it is a heart. Such shapes in different sizes would also allow a pendant, necklace or set of earrings to be fabricated for therapeutic use in humans. Similarly such a device 2 could be hung from a vehicle's interior possibly from the rear view mirror or added to a key chain. It is also envisioned that a plethora of such devices could be assembled into a hanging mobile or wind chime arrangement.

Figure 9:
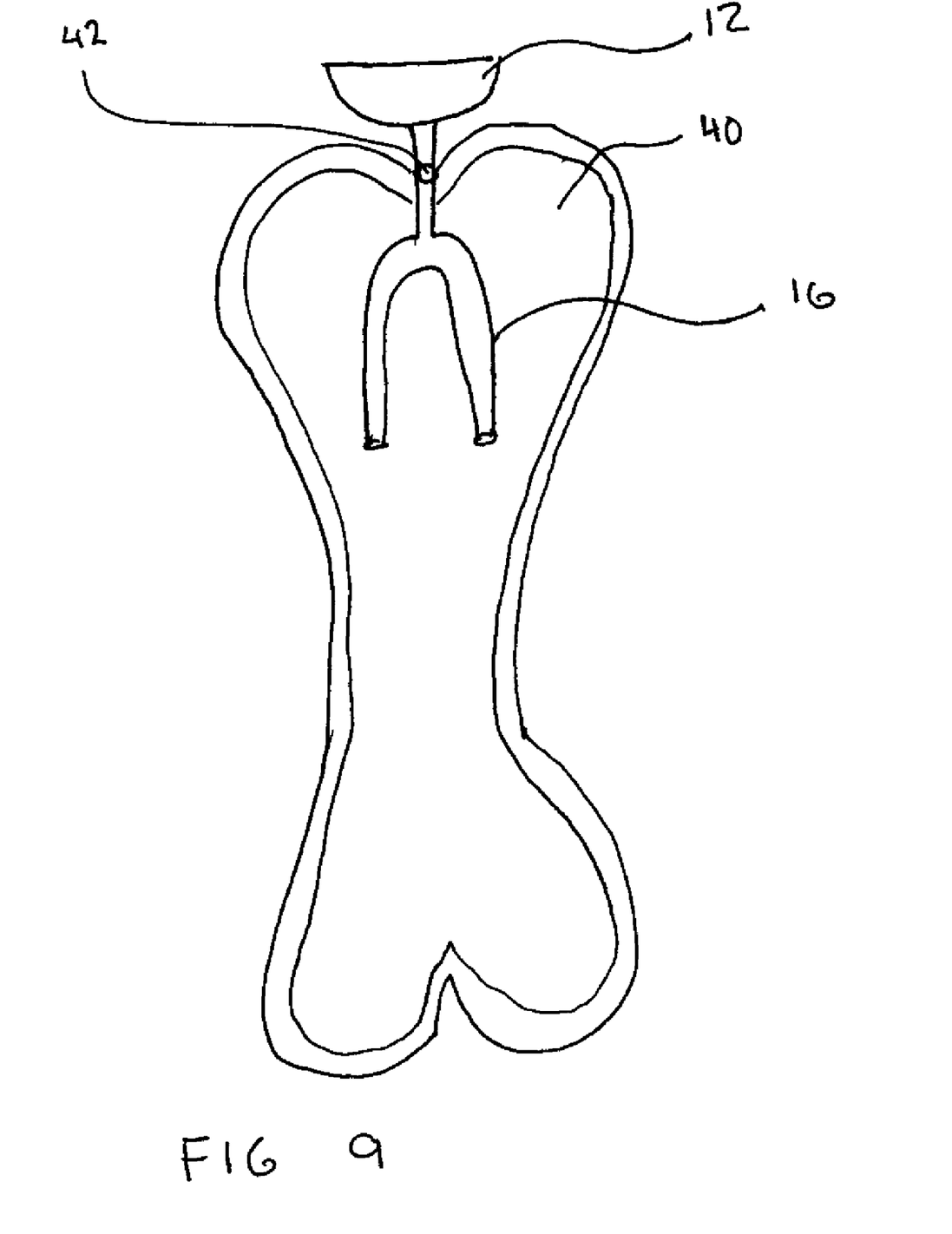
FIG. 9 is a cross sectional front perspective view of a sixth alternate embodiment.

FIG. 9 shows a sixth alternate embodiment wherein the audible frequency generator 16 (whether a tuning fork, tuning rod tube or equivalent device) is held rigid to the hanging tab 12 and a modified hollow enclosure 40 is operably connected to said hanging tab 12 by a pin 42 so as to allow it to move and strike the audible frequency generator 16. This is almost the reverse principle of operation of the above mentioned embodiments. Here a volume adjustment control device (not illustrated) may optionally be used to limit the range of motion that the enclosure 40 can swing in with respect to the audible frequency generator 16.

Figure 10:
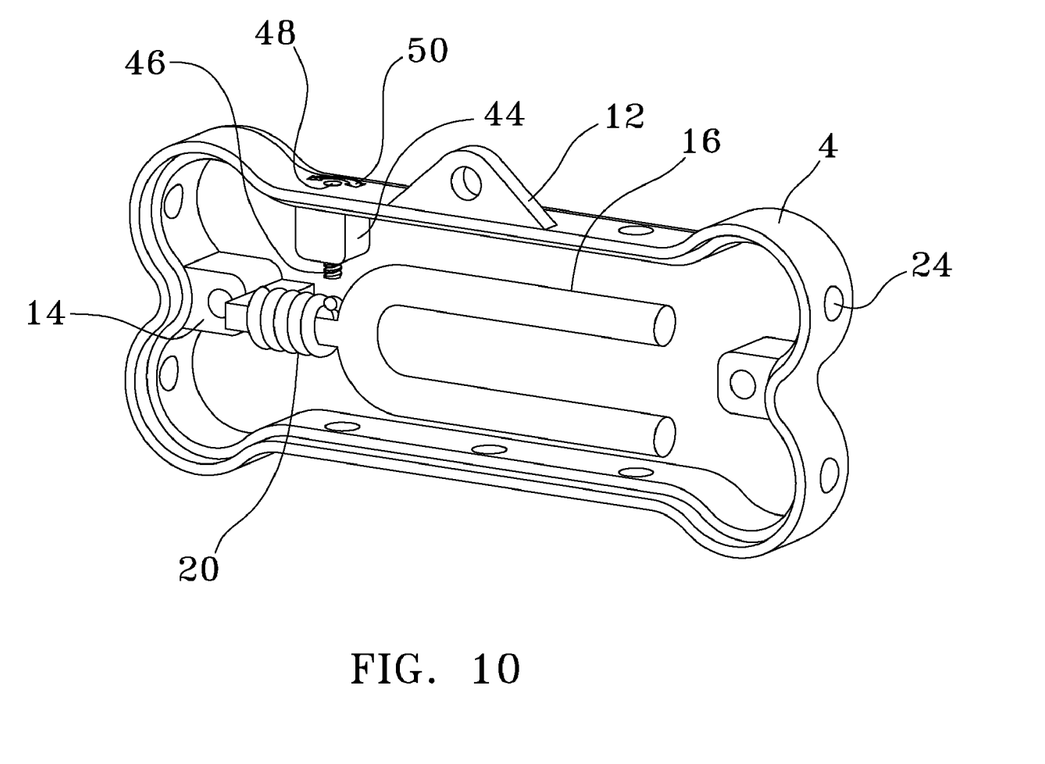
FIG. 10 is a is a front perspective view of the interior cavity of the canine bark suppression device showing the general arrangement of the components in the second alternate embodiment with the optional volume adjustment control.

FIG. 10 is a is a front perspective view of the interior cavity of the canine bark suppression device of the second alternate embodiment incorporating an optional volume sensitivity adjustment control. The volume adjustment control operates on a physical method of constraining the range of motion of the tuning fork 16 within the internal void created between the concave first half 4 and a concave second half 6 of the device. In the second alternate embodiment, suspension means wire 20 holds the tanning fork 16 suspended in the approximate center of the void. As the dog barks and sharply opens and closes his jaws the audible frequency generator 16 (tuning fork) swings upward within the void and then downward to strike the conjoined halves of the device 2. The resulting collision results in the emission of the aforementioned frequency. The larger the back swing of the audible frequency generator 16, the louder the emitted sound. The volume adjustment control is a means of adjusting the amount of back swing. The volume adjustment control is a threaded boss 44 extending from the inside surface of one of the concave halves in an area that wont interfere with the physical contact of the audible frequency generator 16. The threaded section 48 extends from the exterior surface of the concave half completely through the body of the boss 44. A matingly conformed set or grub screw 46 is threadingly engaged with the threaded boss such that it can be advanced to restrict the back swing and thus reduce the level or volume of sound emitted from the collisions. On the outside of the concave half aligned about the threaded section 48 of the boss 44 is a directional guide 50 showing which direction of rotation will increase the volume (+) and which direction of rotation will reduce the volume (−).

Although it can take several different forms, the volume adjustment control function is just to regulate the force of these collisions buy constraining the movement of the audible frequency generator 16 before each collision. The volume adjustment control has an adjustable back swing dampening member (set screw 46 in the above embodiment) that can be advanced toward a portion of the audible frequency generator 16 or as illustrated in the above embodiment, toward the suspension means 20 that allows its movement, so as to reduce the force of the collision and the resulting volume.

In the fourth alternate embodiment of FIG. 5 the volume adjustment control would not change its physical configuration but rather would reside adjacent the second suspension means to restrict the motion of the striking means 22 so as to minimize the collision between the striking means 22 and the tuning fork 16.

In the embodiments discussed it is intended that the device 2 would be waterproof in the meaning of the word that immersion in water will not have any detrimental effects on the device 2. The majority of the components of the preferred embodiment are made of a stainless steel, aluminum, bronze brass or other non water corrodable metal or metal alloy. The choice of a material for the two halves must be resilient yet rigid to transmit the overtones resonating from the vibrating tuning fork. The size of the ports may be adjusted to increase or dampen the emitted sound.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and described to be secured by Letters Patent is as follows:

1. A volume sensitivity adjustable bark suppression device configured to be worn on the collar of a dog comprising:
 a ported rigid enclosure;
 at least one suspension mount;
 at least one suspension means comprising a wound spring having a distal end and a proximate end;
 at least one non-powered audible frequency generator; and
 at least one volume adjustment control;
 wherein said non-powered audible frequency generator is a tuning fork;
 wherein said suspension mount is affixed to an inside surface of said enclosure with said proximate end of said wound spring linearly affixed to said suspension mount, said distal end of said wound spring linearly affixed to said tuning fork such that said tuning fork is linearly suspended and spaced from the interior surfaces of said enclosure at rest and wherein said distal end of said wound spring is swingable within said enclosure when jostled by a barking dog an amount to overcome said wound springs resting tension enabling said tuning fork to strike said inside surface of the enclosure resulting in dog audible frequency generation from said tuning fork;
 wherein said volume adjustment control resides on and extends from said inside surface of said enclosure, adjacent said wound spring and comprises a threaded boss housing a threaded adjustable back swing dampening member that can be threadingly advanced toward said tuning fork to restrict back swing motion of said tuning fork thereby controlling the volume of said audible frequency generated during operation.

2. The bark suppression device of claim 1 wherein said non-powered audible frequency generator resonates with a frequency up to 200,000 Hz after colliding with an inside surface of said enclosure.

3. The bark suppression device of claim 2 further comprising a hanging tab that extends from an outer surface of said enclosure.

4. The bark suppression device of claim 1 wherein said ports are orifices formed between an outer surface and an inner cavity of said enclosure.

5. The bark suppression device of claim 4 wherein the number of suspension mounts is two, the number of suspension means is two and the number of audible frequency generators is two.

6. A volume sensitivity adjustable bark suppression device configured to be worn on the collar of a dog comprising:
 a ported rigid enclosure;
 a first suspension mount;
 a second suspension mount;
 at least one non-powered audible frequency generator;
 at least one audible frequency generator striking means;
 at least one suspension means comprises a wound spring having a distal end and a proximate end;
 at least one volume adjustment control;
 wherein said suspension means is a linear attachment member in the form of a wound spring;
 wherein said non-powered audible frequency generator is a tuning fork;
 wherein said suspension mounts and said volume adjustment control are affixed to an inside surface of said enclosure, and said tuning fork is fixedly mounted to said first suspension mount such that said tuning fork is held suspended and spaced from the interior surfaces of said enclosure;
 wherein said proximate end of said wound spring is affixed to said second suspension mount, said distal end of said wound spring is affixed to said striking means such that said striking means is held operationally suspended between the fork of said tuning fork while the device is at rest, and wherein said distal end of said wound spring is moveable within said enclosure within contacting distance of said tuning fork enabling said striking means to collide with said tuning fork when the device is jostled by a barking dog an amount sufficient to overcome said wound springs resting tension resulting in dog audible frequency generation from said tuning fork;

wherein said volume adjustment control resides on and extends from said inside surface of said enclosure adjacent said wound spring of said striking means and comprises a threaded boss housing an adjustable dampening member that is threadingly advanced toward said striking means so as to restrict the range of motion of said striking means, thereby controlling the volume of said audible frequency generated during operation.

7. The bark suppression device of claim 6 wherein said tuning fork is rigidly affixed to said first suspension mount and said striking means is non-rigidly connected to said second suspension mount.

8. The bark suppression device of claim 7 wherein said non powered audible frequency generator is a tanning fork that resonates with a frequency up to 200,000 Hz after colliding with said striking means.

9. The bark suppression device of claim 6 further comprising a hanging tab that extends from an outer surface of said enclosure.

10. The bark suppression device of claim 6 wherein said ports further comprising at least one orifice formed between an outer surface and an inner cavity of said enclosure.

11. The bark suppression device of claim 10 wherein said enclosure has a concave first half and a concave second half that matingly engage to form an internal cavity within said enclosure.

* * * * *